US009969305B1

(12) United States Patent
Sheriff

(10) Patent No.: US 9,969,305 B1
(45) Date of Patent: May 15, 2018

(54) SWIVELING CHILD SAFETY SEAT

(71) Applicant: Dao Sheriff, Antioch, CA (US)

(72) Inventor: Dao Sheriff, Antioch, CA (US)

( * ) Notice: Subject to any disclaimer, the term of this patent is extended or adjusted under 35 U.S.C. 154(b) by 252 days.

(21) Appl. No.: 14/948,631

(22) Filed: Nov. 23, 2015

(51) Int. Cl.
*B60N 2/28* (2006.01)

(52) U.S. Cl.
CPC ......... *B60N 2/2869* (2013.01); *B60N 2/2821* (2013.01)

(58) Field of Classification Search
CPC .................................................. B60N 2/2869
See application file for complete search history.

(56) References Cited

U.S. PATENT DOCUMENTS

| | | | |
|---|---|---|---|
| 4,936,629 A | 6/1990 | Young | |
| 4,971,392 A | 11/1990 | Young | |
| 5,524,964 A * | 6/1996 | Weimersheimer | B60N 2/14 297/256.1 |
| 6,196,629 B1 * | 3/2001 | Onishi | B60N 2/2806 297/256.12 |
| 6,431,647 B2 * | 8/2002 | Yamazaki | B60N 2/2821 297/250.1 |
| 6,572,189 B1 | 6/2003 | Blaymore | |
| 6,634,708 B2 | 10/2003 | Guenther | |
| 6,746,080 B2 * | 6/2004 | Tsugimatsu | B60N 2/2806 297/216.11 |
| 7,029,069 B2 * | 4/2006 | Hendren | B60N 2/2821 297/256.12 |
| 7,073,859 B1 * | 7/2006 | Wilson | B60N 2/0232 297/250.1 |
| 7,357,451 B2 * | 4/2008 | Bendure | B60N 2/2869 297/256.12 |
| 7,481,492 B2 * | 1/2009 | Lhomme | B60N 2/2806 297/256.12 |
| 7,575,276 B1 | 8/2009 | Henry | |
| 7,722,118 B2 | 5/2010 | Bapst | |
| 7,731,284 B2 | 6/2010 | Lhomme | |
| 7,753,445 B2 | 7/2010 | Kassai | |
| 2004/0178669 A1 * | 9/2004 | Lady | B60N 2/062 297/250.1 |
| 2014/0084650 A1 | 3/2014 | Rabeony | |

FOREIGN PATENT DOCUMENTS

WO    WO2012033414 A1    3/2012

* cited by examiner

*Primary Examiner* — David R Dunn
*Assistant Examiner* — Tania Abraham

(57) ABSTRACT

The swiveling child safety seat that is adapted to be positioned on a seat of a vehicle, and which is able to pivot about a vertical axis. The swiveling child safety seat is further defined with a stationary seat base that is adapted to be secured to the seat of the vehicle. A swiveling child seat is pivotably engaged to the stationary seat base. The swiveling child seat is further defined with a rear surface that includes an armature track that extends laterally across the rear surface. The stationary seat base includes an anti-tilt catch that interacts with the armature track to ensure that the swiveling child seat is properly secured to the stationary seat base. The swiveling child seat includes a pivoting pin that extends downwardly from a bottom surface and engages the stationary seat base.

9 Claims, 6 Drawing Sheets

SWIVELING CHILD SAFETY SEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of child car seats, more specifically, a child safety seat that is able to swivel.

Child safety seats are required for infants and small children. Child safety seats have come a long way over the last years, and have increased safety for small children and infants when traveling in a vehicle. However, child safety seats are bulky, cumbersome, and difficult to secure and release an end user there from.

What is needed and is accomplished via the device of the present disclosure is a child car seat that is able to rotate about a vertical axis, and with respect to a stationary base. The ability of the child car seat to rotate when the vehicle is parked, enables the end user to be facing a doorway of the vehicle thereby aiding in securing or extracting the end user from the child car seat. Once the end user is secured or removed, the child car seat is able to rotate to a forward orientation.

SUMMARY OF INVENTION

The swiveling child safety seat that is adapted to be positioned on a seat of a vehicle, and which is able to pivot about a vertical axis. The swiveling child safety seat is further defined with a stationary seat base that is adapted to be secured to the seat of the vehicle. A swiveling child seat is pivotably engaged to the stationary seat base. The swiveling child seat is further defined with a rear surface that includes an armature track that extends laterally across the rear surface. The stationary seat base includes an anti-tilt catch that interacts with the armature track to ensure that the swiveling child seat is properly secured to the stationary seat base. The swiveling child seat includes a pivoting pin that extends downwardly from a bottom surface and engages the stationary seat base. At least one locking member is rotatably engaged adjacent the pivoting pin to lock or unlock the swiveling child seat with respect to the stationary seat base. In use, the swiveling child seat is able to rotate from a forward orientation to a side orientation to aid in extraction of an end user from said swiveling child seat.

These together with additional objects, features and advantages of the swiveling child safety seat will be readily apparent to those of ordinary skill in the art upon reading the following detailed description of the presently preferred, but nonetheless illustrative, embodiments when taken in conjunction with the accompanying drawings.

In this respect, before explaining the current embodiments of the swiveling child safety seat in detail, it is to be understood that the swiveling child safety seat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the swiveling child safety seat.

It is therefore important that the claims be regarded as including such equivalent construction insofar as they do not depart from the spirit and scope of the swiveling child safety seat. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
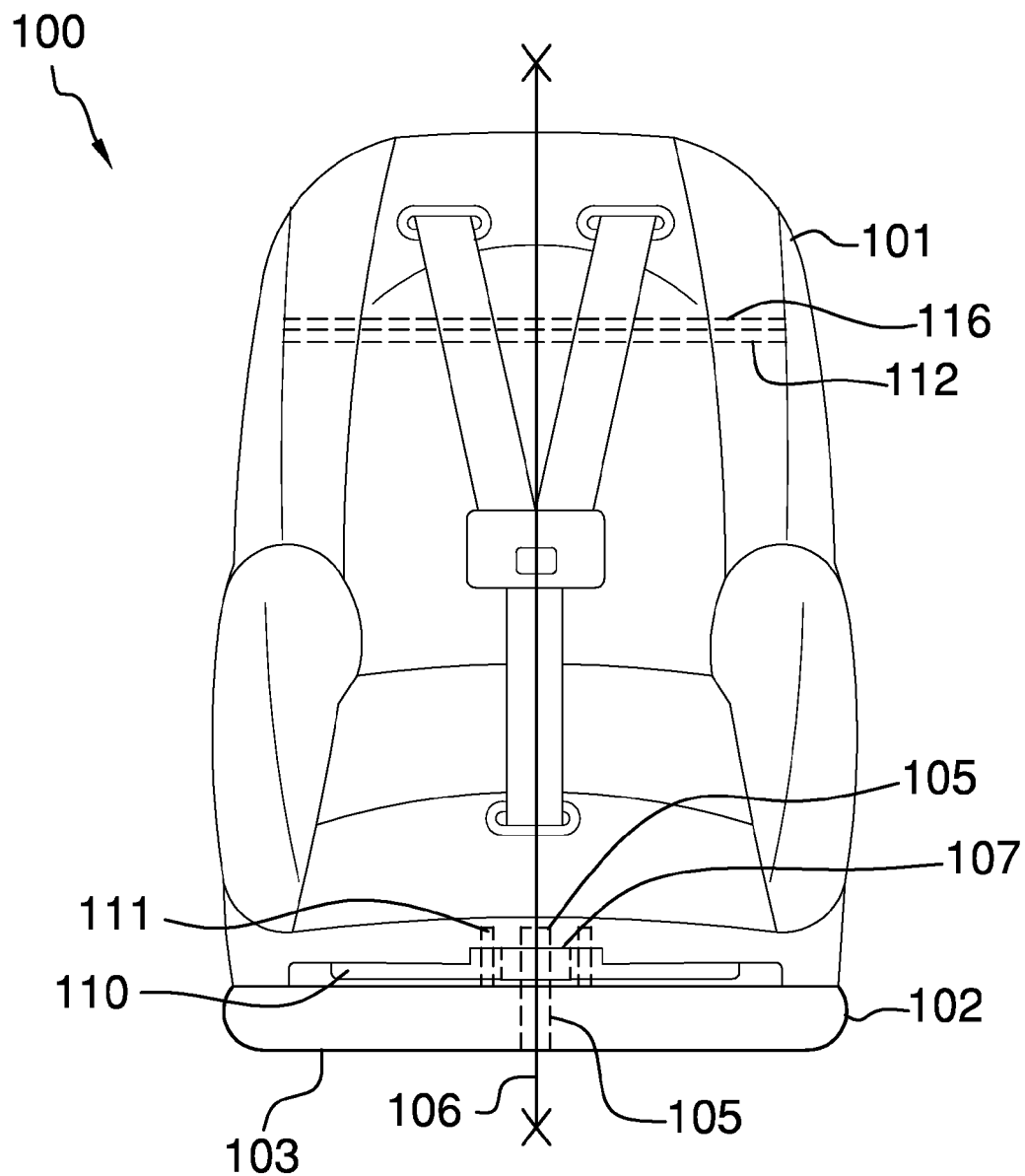
FIG. 1 is a front view of an embodiment of the disclosure.
Figure 2:
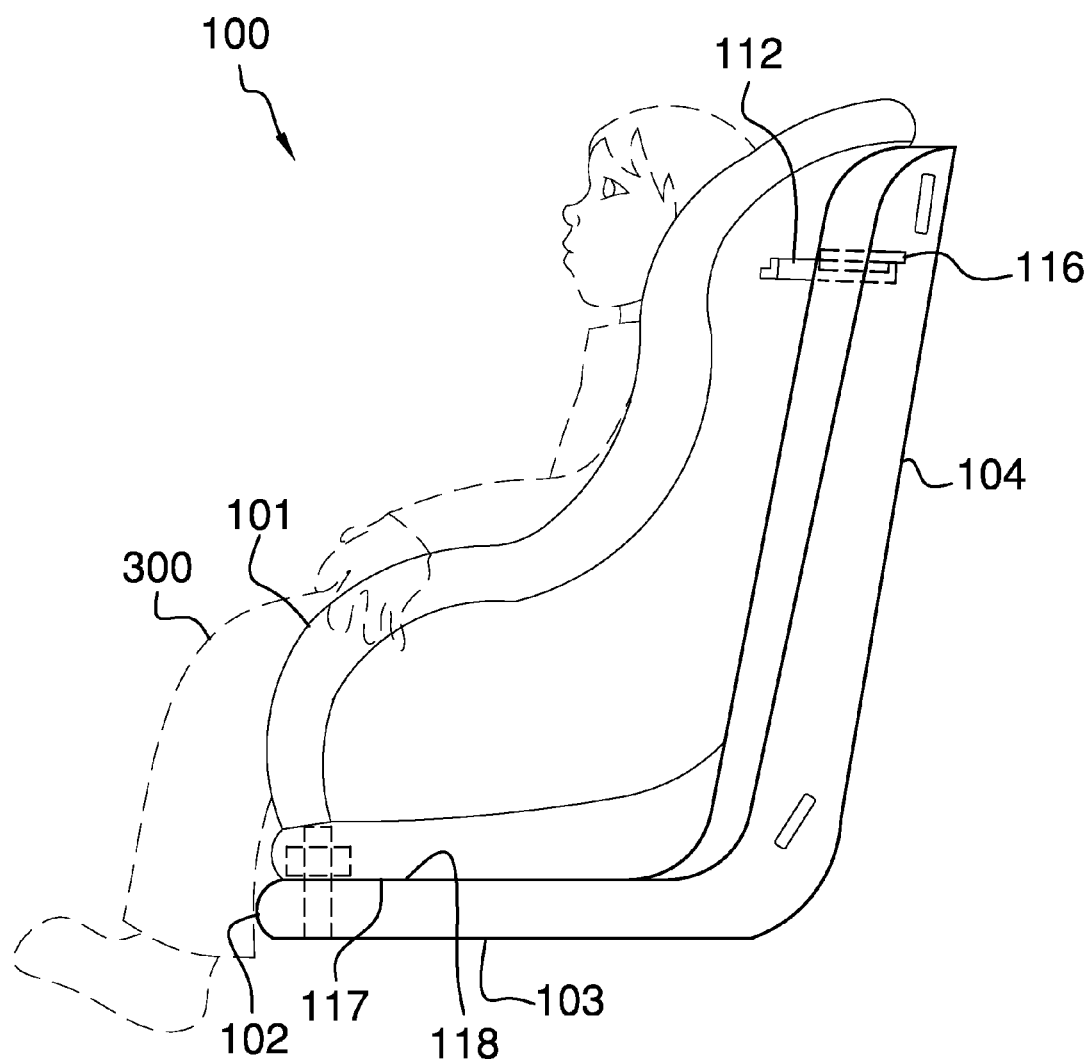
FIG. 2 is a side view of an embodiment of the disclosure.
Figure 3:
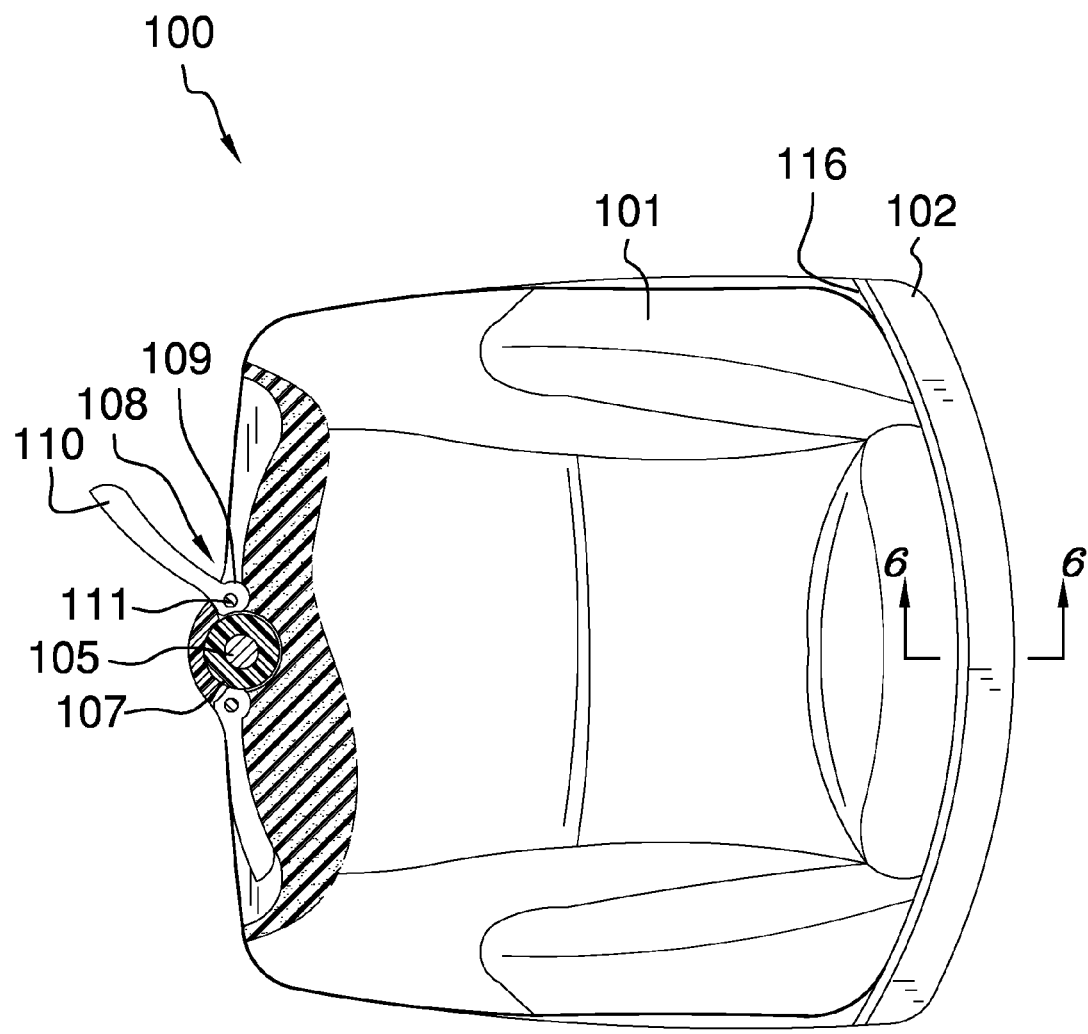
FIG. 3 is a top view of an embodiment of the disclosure.
Figure 4:
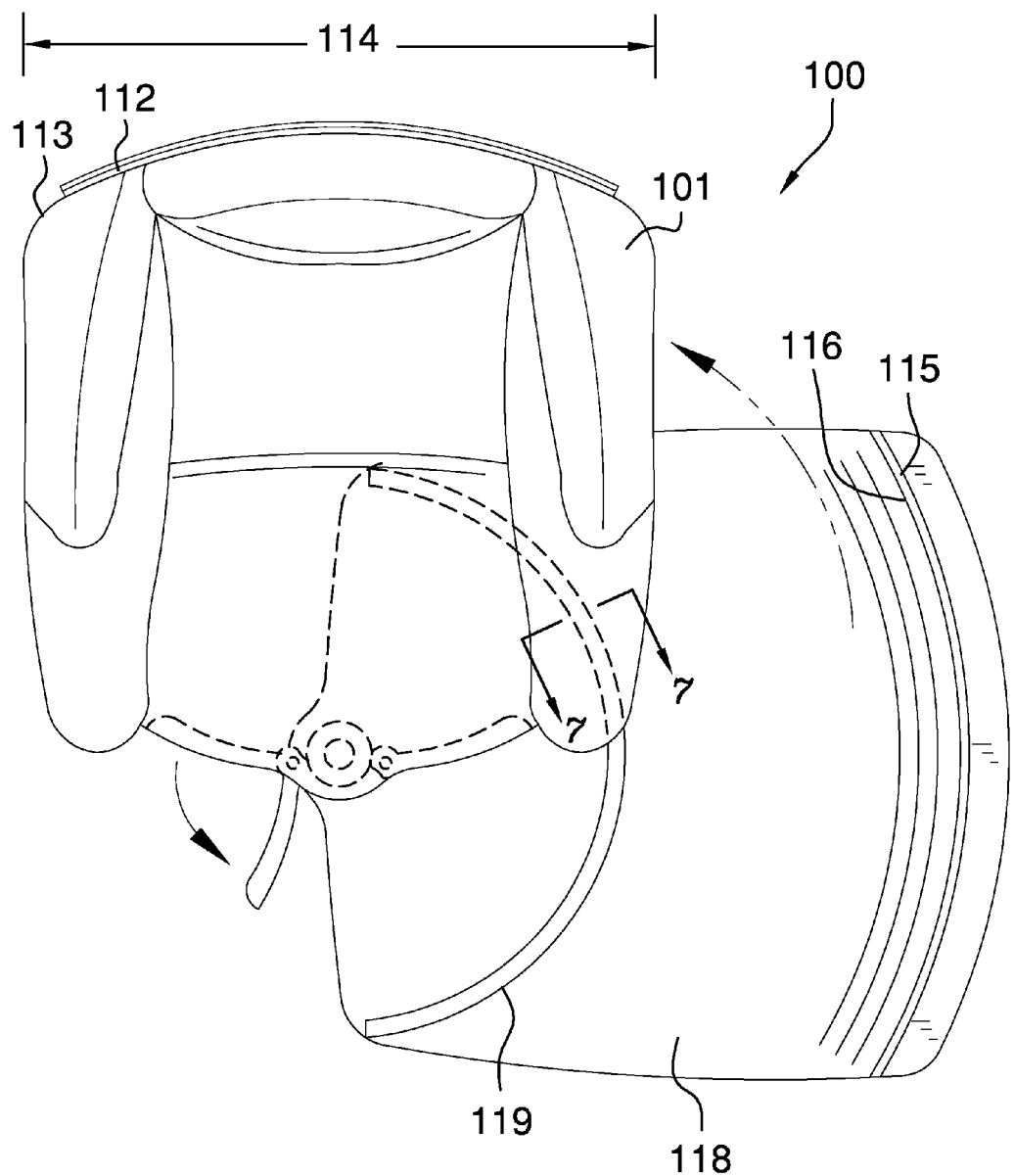
FIG. 4 is a second, tope view of an embodiment of the disclosure.
Figure 5:
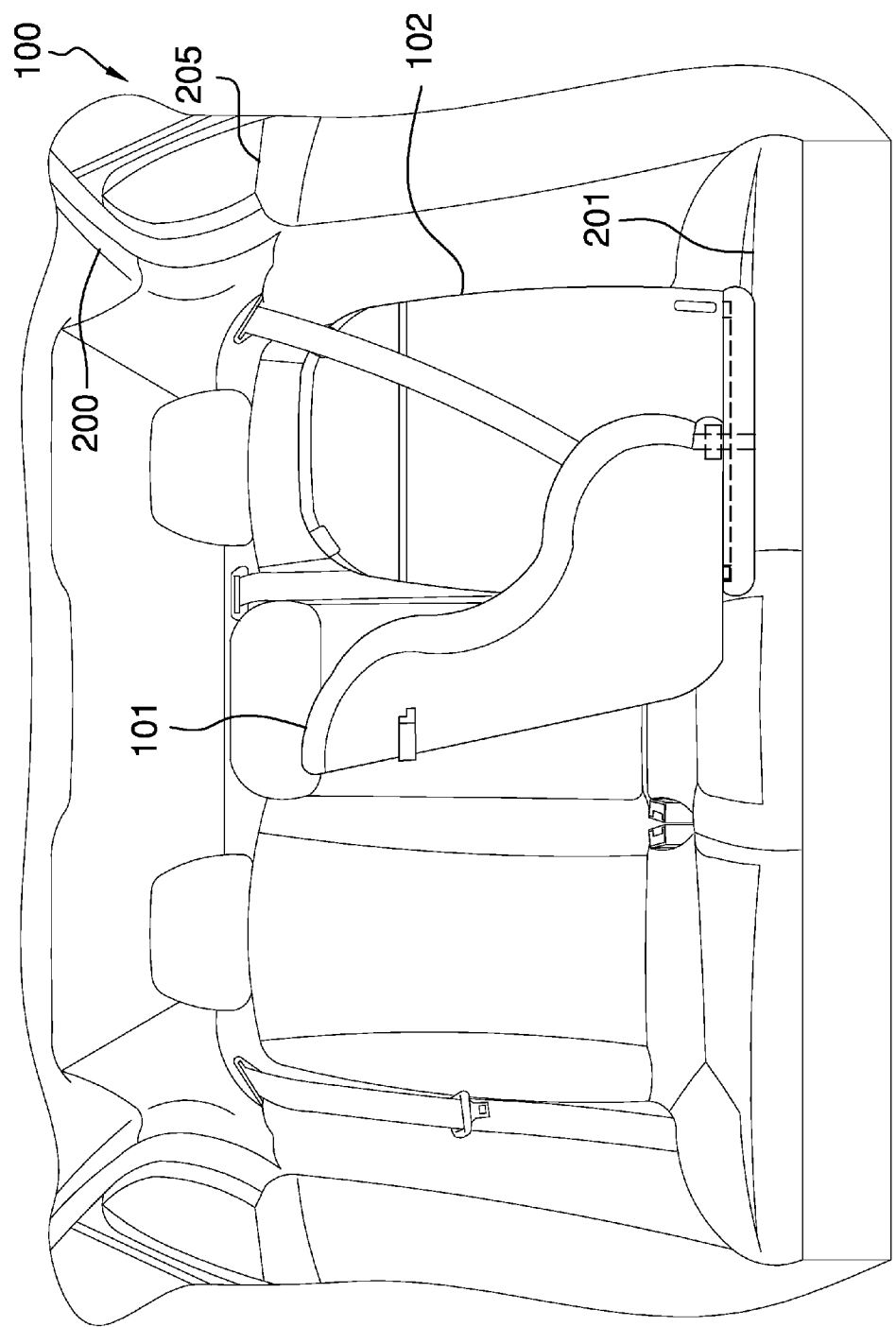
FIG. 5 is an in use view of an embodiment of the disclosure.
Figure 6:
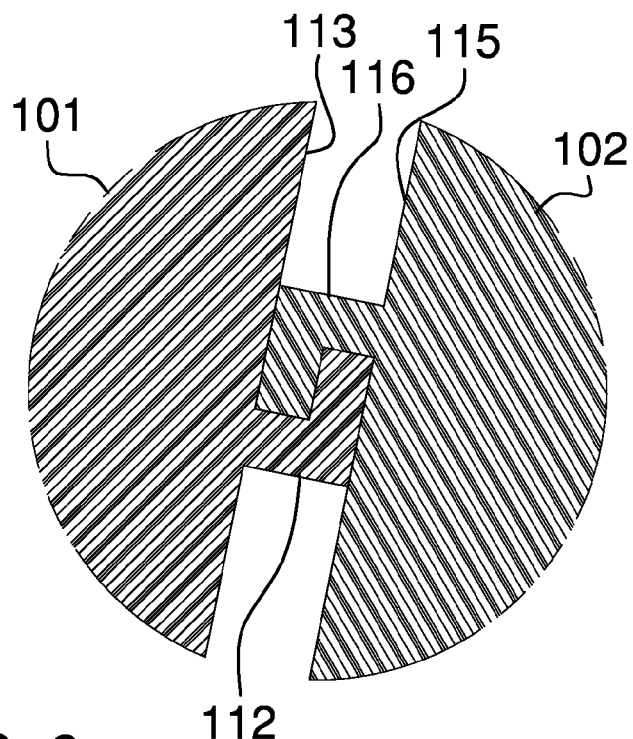
FIG. 6 is a cross-sectional view of an embodiment of the disclosure across line 6-6 in FIG. 3.
Figure 7:
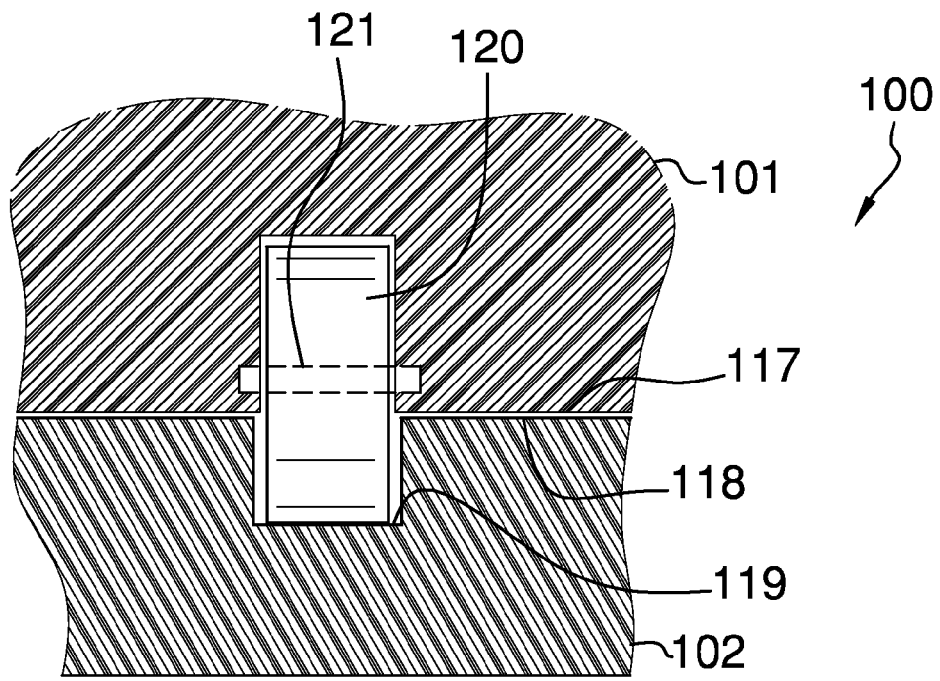
FIG. 7 is a cross-sectional view of an embodiment of the disclosure across line 7-7 in FIG. 4.

Detailed reference will now be made to a first potential embodiment of the disclosure, which is illustrated in FIGS. 1 through 7. The swiveling child safety seat 100 (hereinafter invention) comprises a swiveling child seat 101 that is pivotably affixed to a stationary seat base 102.

The stationary seat base 102 is adapted to be secured atop of and positioned against a seat 201 of a vehicle 200. Moreover, the stationary seat base 102 is further defined with a bottom stationary surface 103 and a rear stationary surface 104 that are adapted to interface with the seat 201 of the vehicle 200. The swiveling child seat 101 is pivotably engaged with respect to the stationary seat base 102 via a pivot rod 105. The pivot rod 105 is vertically oriented such that the swiveling child seat 101 rotates with respect to a vertical axis 106 via the pivot rod 105.

The pivot rod 105 is rigidly affixed to the stationary seat base 102. Moreover, the pivot rod 105 extends upwardly from the stationary seat base 102. The pivot rod 105 is rotatably affixed to a collar member 107. The collar member 107 is able to lock or unlock the ability of the swiveling child seat 101 to rotate relative the stationary seat base 102. Moreover, at least one locking member 108 is provided, and used to lock or unlock the rotational action of the swiveling child seat 101 relative the stationary seat base 102.

The at least one locking member 108 includes a locking cam 109 distally affixed to a locking armature 110. Both the locking cam 109 and the locking armature 110 rotate relative a locking pivot rod 111. The locking pivot rod 111 is parallel with the vertical axis 106. The locking cam 109 rotates via the locking armature 110 to either engage (lock) or disengage (unlock) with respect to the collar member 107.

The swiveling child seat 101 includes an armature track 112 on a rear swiveling surface 113. The armature track 112 extends across a width 114 of the rear swiveling surface 113. It shall be noted that the rear swiveling surface 113 is convexed in shape. The stationary seat base 102 is further defined with a front surface 115 that is concaved, and corresponds with the rear swiveling surface 113 of the swiveling child seat 101. Moreover, the front surface 115 includes an anti-tilt catch 116 that extends across the front surface 115. The anti-tilt catch engages and enables the armature track 112 to slide back and forth. The armature track 112 is able to slide back and forth with respect to the anti-tilt catch 116 thereby securing the swiveling child seat 101 with respect to the stationary seat base 102. Both the anti-tilt catch 116 and the armature track are perpendicular-oriented with respect to the vertical axis 106.

The swiveling child seat 101 is further defined with a bottom swiveling surface 117 that is adjacent to a top stationary surface 118 of the stationary seat base 102. The stationary seat base 102 includes a stationary roller track 119 that is integrated into the top stationary surface 118. Moreover, the bottom swiveling surface 117 of the swiveling child seat 101 includes a swiveling roller member 120. The swiveling roller member 120 is able to roll along the stationary roller track 119. The swiveling roller member 120 rotates via a swiveling pivot rod 121 that is horizontally oriented.

The swiveling roller member 120, the stationary roller track 119, the anti-tilt catch 116, and the armature track 112 collectively work to insure a smooth and laminar rotational movement of the swiveling child seat 101 with respect to the stationary seat base 102. In use, the invention 100 is positioned in a forward facing orientation, but is able to swivel to the left or to the right in order for the swiveling child seat 101 to face towards the door of the vehicle 200. The ability of the swiveling child seat 101 to rotate from a forward facing orientation towards a vehicle door 205 improves the task of loading or unloading an end user 300 from the swiveling child seat 101.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A swiveling child safety seat comprising:
   a swiveling child seat that is able to pivot with respect to a stationary seat base;
   wherein the stationary seat base is adapted to interface with a seat of a vehicle;
   wherein the swiveling child seat is able to seat an end user therein;
   wherein the swiveling child seat is able to rotate from a forward-facing orientation to a side thereby adaptively facing a door of said vehicle in order to adaptively aid in extracting or securing said end user with respect to the swiveling child seat;
   wherein the stationary seat base is further defined with a bottom stationary surface and a rear stationary surface that are adapted to interface with the seat of the vehicle;
   wherein the swiveling child seat is pivotably engaged with respect to the stationary seat base via a pivot rod;
   wherein the pivot rod is vertically oriented such that the swiveling child seat rotates with respect to a vertical axis via the pivot rod;
   wherein the pivot rod is rigidly affixed to the stationary seat base;
   wherein the pivot rod extends upwardly from the stationary seat base;
   wherein the pivot rod is rotatably affixed to a collar member;
   wherein the collar member is able to lock or unlock the ability of the swiveling child seat to rotate relative the stationary seat base;
   wherein at least one locking member is provided, and used to lock the rotational action of the swiveling child seat relative the stationary seat base;
   wherein the at least one locking member includes a locking cam distally affixed to a locking armature;
   wherein both the locking cam and the locking armature rotate relative a locking pivot rod.

2. The swiveling child safety seat according to claim 1 wherein the locking pivot rod is parallel with the vertical axis; wherein the locking cam rotates via the locking armature to either engage or disengage with respect to the collar member.

3. The swiveling child safety seat according to claim 2 wherein the swiveling child seat includes an armature track on a rear swiveling surface; wherein the armature track extends across a width of the rear swiveling surface.

4. The swiveling child safety seat according to claim 3 wherein the rear swiveling surface is convex in shape across the width; wherein the stationary seat base is further defined with a front surface that is concave, and corresponds with the rear swiveling surface of the swiveling child seat.

5. The swiveling child safety seat according to claim 4 wherein the front surface includes an anti-tilt catch that extends across the front surface; wherein the anti-tilt catch engages and enables the armature track to slide back and forth.

6. The swiveling child safety seat according to claim 5 wherein the armature track is able to slide back and forth with respect to the anti-tilt catch thereby securing the swiveling child seat with respect to the stationary seat base; wherein both the anti-tilt catch and the armature track are perpendicular-oriented with respect to the vertical axis.

7. The swiveling child safety seat according to claim 6 wherein the swiveling child seat is further defined with a bottom swiveling surface that is adjacent to a top stationary surface of the stationary seat base; wherein the stationary seat base includes a stationary roller track that is integrated into the top stationary surface.

8. The swiveling child safety seat according to claim 7 wherein the bottom swiveling surface of the swiveling child seat includes a swiveling roller member; wherein the swiveling roller member is able to roll along the stationary roller track.

9. The swiveling child safety seat according to claim 8 wherein the swiveling roller member rotates via a swiveling pivot rod that is horizontally oriented.

\* \* \* \* \*